(12) United States Patent
Lee et al.

(10) Patent No.: US 12,136,826 B2
(45) Date of Patent: Nov. 5, 2024

(54) METHOD FOR PERFORMING WIRELESS CHARGING, WIRELESS POWER TRANSMISSION DEVICE, AND STORAGE MEDIUM

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Kyungmin Lee, Suwon-si (KR); Kiyoung Kim, Suwon-si (KR); Gun-Woo Moon, Daejeon (KR); Young-Dal Lee, Daejeon (KR); Dongmin Kim, Daejeon (KR); Jaeil Baek, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 492 days.

(21) Appl. No.: 17/503,642

(22) Filed: Oct. 18, 2021

(65) Prior Publication Data
US 2022/0037927 A1 Feb. 3, 2022

Related U.S. Application Data

(63) Continuation of application No. PCT/KR2020/004980, filed on Apr. 13, 2020.

(30) Foreign Application Priority Data

Apr. 18, 2019 (KR) .......................... 10-2019-0045665

(51) Int. Cl.
*H02J 50/12* (2016.01)
*H02J 50/80* (2016.01)

(52) U.S. Cl.
CPC .............. *H02J 50/12* (2016.02); *H02J 50/80* (2016.02)

(58) Field of Classification Search
CPC .................................. H02J 50/12; H02J 50/80
See application file for complete search history.

(56) References Cited

U.S. PATENT DOCUMENTS

| 2013/0099592 A1* | 4/2013 | Abe .......................... G01V 3/10 307/104 |
| 2014/0197693 A1 | 7/2014 | Fujita et al. |

(Continued)

FOREIGN PATENT DOCUMENTS

| JP | H10-225129 | 8/1998 |
| JP | 2016-532425 | 10/2016 |

(Continued)

OTHER PUBLICATIONS

International Search Report for PCT/KR2020/004980 mailed Jul. 17, 2020, 4 pages.

(Continued)

*Primary Examiner* — Carlos Amaya
(74) *Attorney, Agent, or Firm* — Nixon & Vanderhye, P.C.

(57) ABSTRACT

According to various embodiments, a wireless power transmission device may comprise: a coil circuit configured to generate a power signal for power transmission to an electronic device; an inverter configured to convert direct current power to alternating current power and to provide the alternating current power to the coil circuit; a coil-type detection unit comprising a coil disposed to be adjacent to the coil circuit and configured to detect a signal correspond- (Continued)

ing to the power signal; and a control circuit configured to adjust, based on the detected signal, a switching frequency of the inverter to change the alternating current power output from the inverter.

11 Claims, 13 Drawing Sheets

(56) References Cited

U.S. PATENT DOCUMENTS

| | | | |
|---|---|---|---|
| 2015/0061578 A1 | 3/2015 | Keeling et al. | |
| 2016/0013662 A1* | 1/2016 | Wakabayashi | H02J 50/12 307/104 |
| 2017/0201126 A1 | 7/2017 | Ahn et al. | |
| 2017/0279310 A1* | 9/2017 | Ii | H02J 50/80 |
| 2017/0302109 A1 | 10/2017 | Lee et al. | |
| 2018/0102813 A1 | 4/2018 | Ko et al. | |
| 2018/0236879 A1* | 8/2018 | Elshaer | H02J 50/90 |
| 2018/0316226 A1 | 11/2018 | Jung et al. | |
| 2019/0011523 A1* | 1/2019 | Avestruz | G01R 35/005 |
| 2019/0312430 A1 | 10/2019 | Williams et al. | |
| 2019/0312465 A1 | 10/2019 | Yeo et al. | |

FOREIGN PATENT DOCUMENTS

| | | |
|---|---|---|
| JP | 2017-073968 | 4/2017 |
| JP | 2020-010415 | 1/2020 |
| KR | 10-2013-0045167 | 5/2013 |
| KR | 10-1284929 | 7/2013 |
| KR | 10-2014-0121200 | 10/2014 |
| KR | 10-2017-0061787 | 6/2017 |
| KR | 10-2017-0083886 | 7/2017 |
| KR | 10-2017-0109299 | 9/2017 |
| KR | 10-2017-0112900 | 10/2017 |
| KR | 10-2017-0119482 | 10/2017 |
| KR | 10-2017-0128055 | 11/2017 |
| KR | 10-2018-0002997 | 1/2018 |
| KR | 10-2018-0005427 | 1/2018 |
| KR | 10-2018-0087879 | 8/2018 |
| KR | 10-2018-0134329 | 12/2018 |
| KR | 10-2018-0137391 | 12/2018 |

OTHER PUBLICATIONS

Written Opinion of the ISA for PCT/KR2020/004980 mailed Jul. 17, 2020, 4 pages.
Korean Office Action issued Nov. 23, 2023 in corresponding Korean Patent Application No. 10-2019-0045665.

* cited by examiner

METHOD FOR PERFORMING WIRELESS CHARGING, WIRELESS POWER TRANSMISSION DEVICE, AND STORAGE MEDIUM

CROSS-REFERENCE TO RELATED APPLICATIONS

This application is a continuation of International Application No. PCT/KR2020/004980 designating the United States, filed on Apr. 13, 2020, in the Korean Intellectual Property Receiving Office and claiming priority to Korean Patent Application No. 10-2019-0045665, filed Apr. 18, 2019, in the Korean Intellectual Property Office, the disclosures of which are incorporated by reference herein in their entireties.

BACKGROUND

Field

Various embodiments relate to a method for performing wireless charging, a wireless power transmission device, and a storage medium.

Description of Related Art

Portable digital communication devices have become a must-have item for everyone in modern era. Customers desire to receive various high-quality services anytime, anywhere. Recent development of Internet of Thing (IoT) technology bundles various sensors, home appliances, and communication devices up into a single network. A diversity of sensors require a wireless power transmission system for seamless operations.

Wireless power transmission may be performed in a magnetic induction, magnetic resonance, and electromagnetic wave scheme. The magnetic induction or magnetic resonance scheme is advantageous in charging electronic devices positioned within a relatively short distance from the wireless power transmission device. The electromagnetic wave scheme is more advantageous for remote power transmission that reaches a few meters as compared with the magnetic induction or magnetic resonance scheme. An electronic device that wirelessly receives power based on the electromagnetic wave scheme may wirelessly receive power by converting the radio frequency (RF) wave formed by a wireless power transmission device into electrical energy.

Wireless power consortium (WPC) standards (or QI standards) and alliance for wireless power (A4WP) standards (or air fuel alliance (AFA) standards) have been prepared for magnetic induction schemes and resonance schemes, respectively. As per the WPC standards, an electronic device receiving power may perform in-band communication with a wireless power transmission device by an on/off keying modulation scheme. In addition, as per the A4WP standards, the electronic devices includes a separate communication module (e.g., a Bluetooth low energy (BLE) communication module) for out-band communication. The electronic device may steadily report its internal sensing information (e.g., the magnitude of voltage, current, or power at, at least one point in the electronic device) to a wireless power transmission device after charging is started.

The electromagnetic induction-type wireless charging system has significant coil leakage inductance between the transmission circuit of the wireless power transmission device and the reception circuit of the electronic device. Thus, the output may drastically fluctuate even with a tiny variation in the switching frequency of the inverter of the wireless power transmission device and, accordingly, wireless charging efficiency may be deteriorated. For stable charging/discharging control at the battery end, the electronic device is required to transmit, in real-time, the input voltage of the battery control converter, i.e., the converter output voltage information of the inductive power transfer (IPT), to the wireless power transmission device. However, due to limitations to the transmission speed of several tens of msec to several hundreds of msec in bi-lateral communication using communication modules, it is difficult to transfer necessary information to the transmit side in real-time. Such limitations lead to slow dynamic characteristics of failure in quick, real-time control of the output voltage of the IPT converter in an environment where the load is rapidly changed as compared with the communication speed.

Therefore, a need arises for a method for identifying the status of power, e.g., load voltage, of the electronic device being wirelessly charged, even without sensing information through the communication module.

SUMMARY

According to various example embodiments, a wireless power transmission device may comprise: a coil circuit configured to generate a power signal for transmission of power to an electronic device, an inverter configured to convert direct current (DC) power into alternating current (AC) power and to provide the AC power to the coil circuit, a coil-type detection unit comprising a coil disposed adjacent to the coil circuit configured to detect a signal corresponding to the power signal, and a control circuit configured to adjust a switching frequency of the inverter to change AC power output from the inverter based on the detected signal.

According to various example embodiments, a method for wireless charging by a wireless power transmission device may comprise: inverting DC power into AC power through an inverter of the wireless power transmission device and outputting the AC power, generating a power signal for transmission of power to an electronic device through a coil circuit of the wireless power transmission device, detecting a signal corresponding to the power signal using a coil-type detection unit disposed adjacent to the coil circuit, and adjusting a switching frequency of the inverter to change AC power output from the inverter based on the detected signal.

According to various example embodiments, there may be provided a storage non-transitory computer-readable storage medium storing instructions configured to be executed by at least one processor to enable the at least one processor to perform at least one operation. The at least one operation may comprise: inverting DC power into AC power through an inverter of a wireless power transmission device and outputting the AC power, generating a power signal for transmission of power to an electronic device through a coil circuit of the wireless power transmission device, detecting a signal corresponding to the power signal using a coil-type detection unit disposed adjacent to the coil circuit, and adjusting a switching frequency of the inverter to change AC power output from the inverter based on the detected signal.

According to various example embodiments, it is possible to identify the status of power applied to the electronic device, being wirelessly charged, in real-time even without sensing information through the communication module.

According to various example embodiments, it is possible to address the slow control dynamic characteristics of the wireless charging system using the communication module and to enhance, in real-time, the output voltage dynamic characteristics in load variations.

According to various example embodiments, it is possible to achieve quick and stable charging by effectively varying the switching frequency through overcoming the restriction causing the switching frequency to be varied in a narrow range at the inverter end due to the relatively large leakage inductance of the transmit/receive-side coil in an electromagnetic induction-type wireless charging system.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

Figure 1:
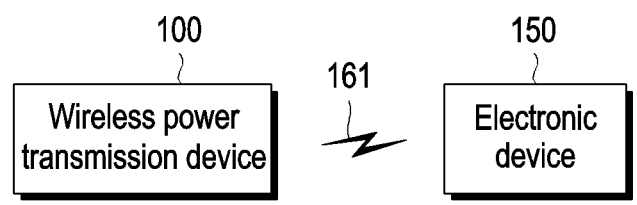
FIG. 1 is a block diagram illustrating an example wireless power transmission device and an electronic device according to various embodiments.

FIG. 1 is a block diagram illustrating an example wireless power transmission device and an electronic device according to various embodiments.

Referring to FIG. 1, according to various embodiments, a wireless power transmission device 100 may wirelessly transmit power 161 to an electronic device 150. The wireless power transmission device 100 may transmit the power 161 to the electronic device 150 according to various charging schemes. For example, the wireless power transmission device 100 may transmit power 161 as per an induction scheme.

Adopting the induction scheme, the wireless power transmission device 100 may include, e.g., a power source, a direct current (DC)-alternating current (AC) converting circuit, an amplifying circuit, an impedance matching circuit, at least one capacitor, at least one coil, and a communication modulation/demodulation circuit. The at least one capacitor together with the at least one coil may include a resonance circuit.

The wireless power transmission device 100 may be implemented in a scheme defined in the WPC standards (or Qi standards). For example, the wireless power transmission device 100 may transmit power 161 as per a resonance scheme. Adopting the resonance scheme, the wireless power transmission device 100 may include, e.g., a power source, a DC-AC converting circuit, an amplifying circuit, an impedance matching circuit, at least one capacitor, at least one coil, and an out-band communication circuit (e.g., a Bluetooth low energy (BLE) communication circuit). The at least one capacitor and the at least one coil may include a resonance circuit.

The wireless power transmission device 100 may be implemented in a scheme defined in the A4WP standards (or AFA standards). The wireless power transmission device 100 may include a coil that is capable of produce a magnetic field when letting an electric current flow thereacross by a resonance or induction scheme. The process of the wireless power transmission device 100 producing an induced magnetic field may be represented as the wireless power transmission device 100 wirelessly transmitting the power 161. Further, the electronic device 150 may include a coil that produces an induced electromotive force by the magnetic field generated around and varying in magnitude over time. The process of the electronic device 150 producing an induced electromotive force through the coil may be represented as the electronic device 150 wirelessly receiving the power 161.

According to various embodiments, the wireless power transmission device 100 may communicate with the electronic device 150. For example, the wireless power transmission device 100 may communicate with the electronic device 150 as per an in-band scheme. The wireless power transmission device 100 or the electronic device 150 may vary the load (or impedance) on the data to be transmitted, according to, e.g., an on/off keying modulation scheme. The wireless power transmission device 100 or the electronic device 150 may determine data transmitted from its opposite device by measuring a variation in load or impedance based on a variation in the current, voltage, or power across the coil. For example, the wireless power transmission device 100 may communicate with the electronic device 150 as per an out-band scheme. The wireless power transmission device 100 or the electronic device 150 may communicate data using a communication circuit (e.g., a BLE communication module) provided separately from the coil or patch antennas.

According to various embodiments, the "wireless power transmission device 100, the electronic device 150, or another electronic device performs a particular operation" may refer, for example, to various hardware devices, e.g., a control circuit, such as a processor, a coil, or a patch antenna, included in the wireless power transmission device 100, the electronic device 150, or the other electronic device performing the particular operation. The "wireless power transmission device 100, the electronic device 150, or another electronic device performs a particular operation" may also refer, for example, to the processor controlling another hardware device to perform the particular operation. The "wireless power transmission device 100, the electronic device 150, or another electronic device performs a particular operation" may also refer to the processor or another hardware device triggering the particular operation as an instruction for performing the particular operation, which is stored in a storage circuit (e.g., a memory) of the wireless power transmission device 100, the electronic device 150, or the other electronic device, is executed.

Figure 2:
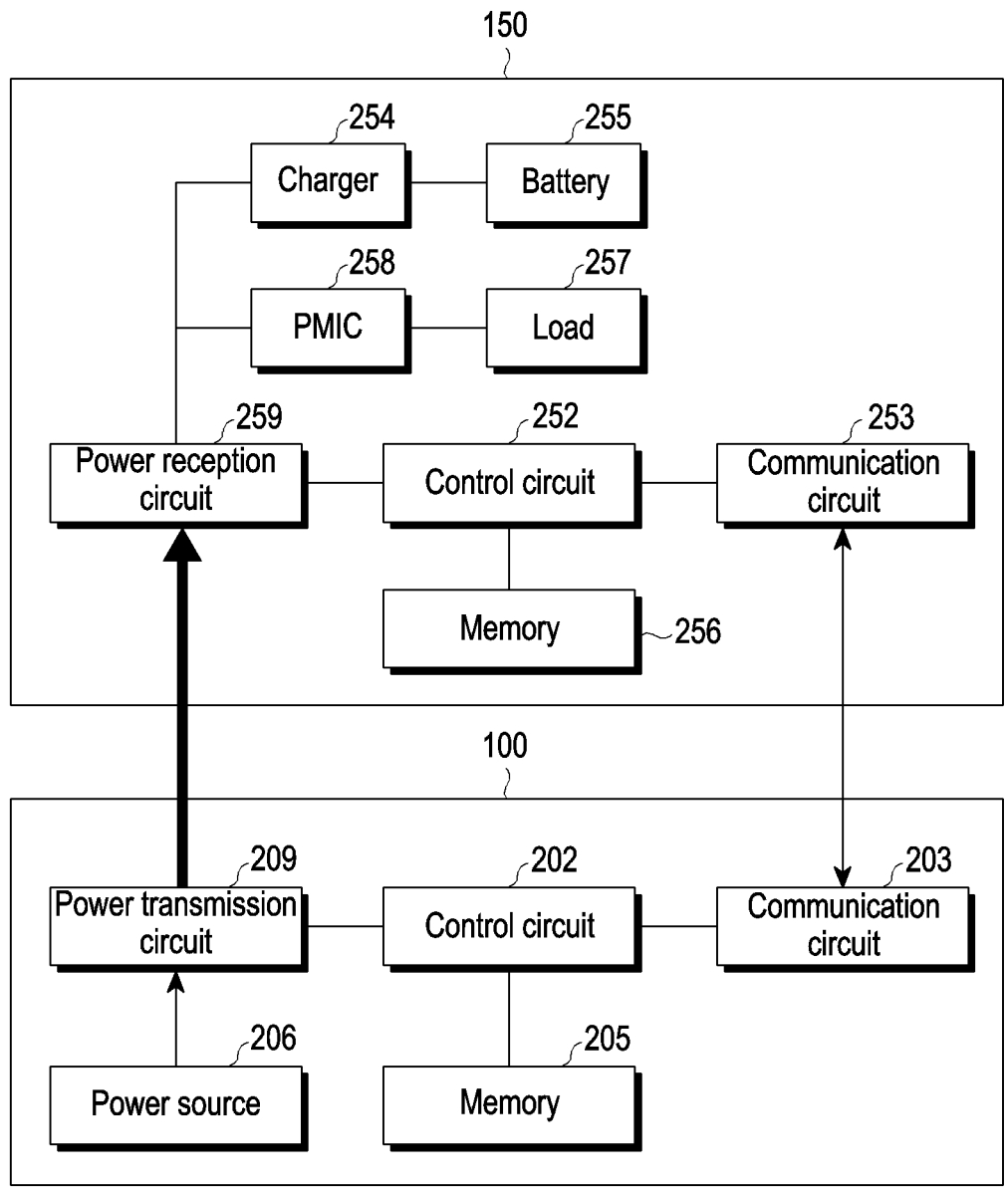
FIG. 2 is a block diagram illustrating an example wireless power transmission device and an electronic device according to various embodiments.

FIG. 2 is a block diagram illustrating an example wireless power transmission device and an electronic device according to various embodiments.

According to various embodiments, a wireless power transmission device 100 may include a power transmission circuit 209, a control circuit 202, a communication circuit 203, a memory 205, and a power source 206. According to various embodiments, the electronic device 150 may include a power reception circuit 259, a control circuit 252, a communication circuit 253, a memory 256, a charger 254, a battery 255, a power management integrated circuit (PMIC) 258, and a load 257.

According to various embodiments, the power transmission circuit 209 may wirelessly transmit power to the power reception circuit 259 according to at least one of an induction scheme, a resonance scheme, or an electromagnetic wave scheme. Detailed configurations of the power transmission circuit 209 and the power reception circuit 259 are described in more detail with reference to FIG. 3. The control circuit 202 may control the magnitude of power that the power transmission circuit 209 transmits. For example, the control circuit 202 may control the magnitude of power output from the power source 206 and control the gain of a power amplifier included in the power transmission circuit 209, thereby controlling the magnitude of power that the power transmission circuit 209 transmits. The control circuit 202 may adjust the magnitude of power output from the power source 206 by controlling the duty cycle or frequency of power output from the power source 206. The power source 206 may include, e.g., a power interface connectable to an outlet. The power source 206106 may receive AC power, which has a voltage set per country, from the outlet and send the power to the power transmission circuit 209.

The control circuit 202 may control the magnitude of power applied to the power transmission circuit 209 by controlling the magnitude of the bias voltage of the power amplifier. The control circuit 202 or the control circuit 252 may be implemented in various circuits capable of performing calculation, such as a central processing unit (CPU) or other general-purpose processors, a mini-computer, a microprocessor, a micro controlling unit (MCU), or a field programmable gate array (FPGA), but not limited in type thereto.

According to various embodiments, the power reception circuit 259 may wirelessly receive power as per at least one of an induction scheme, a resonance scheme, or an electromagnetic wave scheme from the power transmission circuit 209. For example, the power reception circuit 259 may include a power reception antenna for wirelessly receiving a power signal.

The power reception circuit 259 may performing power processing, such as rectifying the received alternating current (AC) power into a direct current (DC) waveform, converting the voltage, or regulating the power.

The charger 254 may charge the battery 255 of the electronic device 150. The charger 254 may charge the battery 255 in a constant voltage (CV) mode or a constant current (CC) mode, but not limited to such charging modes. The PMIC 258 may adjust the power into a voltage or current appropriate for the load 257 connected and provide the adjusted power to the load 257. The control circuit 252 may control the overall operation of the electronic device 150, and at least one processor may replace the control circuit 252. The memory 256 may store instructions to perform the overall operation of the electronic device 150. The memory 205 may store instructions to perform the operation of the wireless power transmission device 100. The memory 205 or the memory 256 may be implemented in various types, such as a read only memory (ROM), a random access memory (RAM), or a flash memory, but not limited in type thereto.

Figure 3:
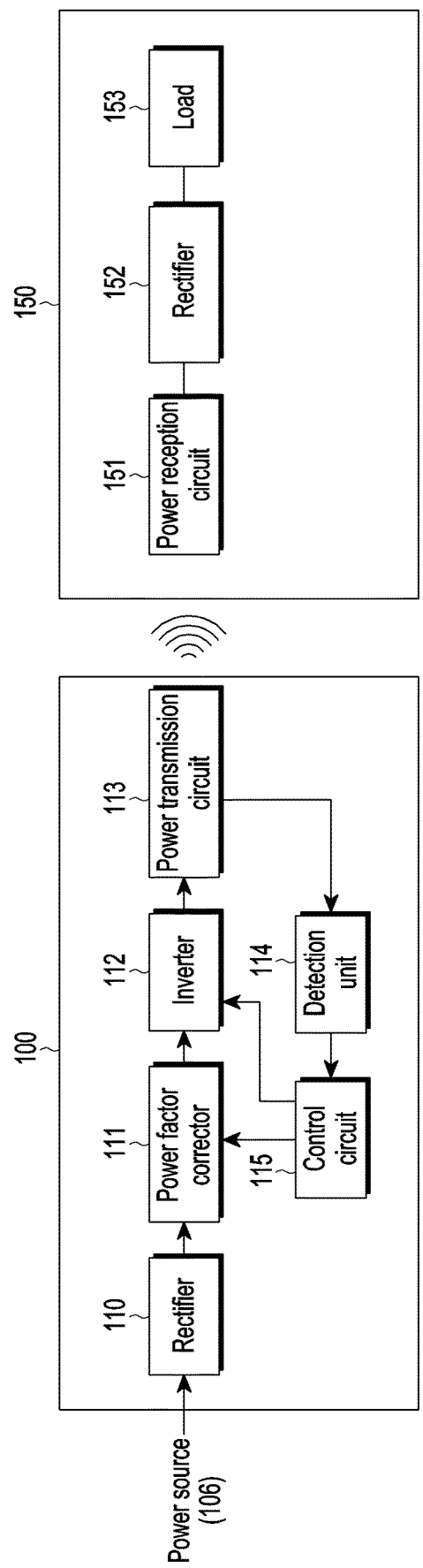
FIG. 3 is a block diagram illustrating an example induction scheme-based wireless power transmission device and an electronic device according to various embodiments.

FIG. 3 is a block diagram illustrating an example induction scheme-based wireless power transmission device and an electronic device according to various embodiments.

According to various embodiments, the wireless power transmission device 100 may include a connection to a power source 106, a rectifier 110, a power factor corrector (e.g., including circuitry) 111, an inverter 112, a power transmission circuit 113, a detection unit (e.g., including detection circuitry) 114, and a control circuit 115. The electronic device 150 may include a power reception circuit 151, a rectifier 152, and a load 153. According to various embodiments, the wireless power transmission device 100 may wirelessly transmit power to the electronic device 150 according to at least one of an induction scheme, a resonance scheme, or an electromagnetic wave scheme.

According to various embodiments, the power transmission circuit 113 may include one or more coils.

The control circuit 115 may control the magnitude of power that the wireless power transmission device 100 transmits. For example, the control circuit 115 may control the magnitude of power output from the rectifier 110 or the power factor corrector 111 or may control the magnitude of power transmitted from the wireless power transmission device 100 according to control between the power factor corrector 111 and the inverter 112 or between the inverter 112 and the power transmission circuit 113. For example, the control circuit 115 may adjust the magnitude of power wirelessly transmitted from the wireless power transmission device 100 by controlling the switching frequency of the inverter 112. Alternatively, the control circuit 115 may adjust the magnitude of power wirelessly transmitted from the wireless power transmission device 100 by controlling the link voltage of the power factor corrector 111. Alternatively, the control circuit 115 may adjust the magnitude of the power by controlling the duty cycle (or width) of the power output from the inverter 112 together with the switching frequency.

The control circuit 115 may be implemented in various circuits capable of performing calculation, such as a CPU or other general-purpose processors, a mini-computer, a microprocessor, an MCU, or an FPGA, but not limited in type thereto.

The rectifier 110 may rectify alternating current (AC) power from the power source 106, and may be disposed between the power source 106 and the power factor corrector 111. The rectifier 110 may be implemented as, e.g., a bridge rectifier, but is not limited thereto.

The power factor corrector (PFC) 111 may include various circuitry and convert AC power supplied from the power source 110 into direct current (DC) power, and may control the magnitude of DC power supplied to the inverter 112. The power factor corrector 111 may perform an operation to meet harmonic regulation and power factor conditions. For example, the power factor corrector 111 may also be referred to as a PFC converter and may perform boost PFC constant voltage output control. According to an embodiment, the power factor corrector 111 may provide a link voltage (e.g., $V_{link}$) input to the inverter 112 and may control the link voltage value. Accordingly, the power factor corrector 111 may control the power induced in the power transmission circuit 113 (e.g., the coil) by controlling the link voltage value. Further, the power factor corrector 111 may control a difference in position between signals, such as voltages or currents, input to the power transmission circuit 113, and may perform some of the functions of pulse width modulation (PWM). Alternatively, a pulse width modulator (not shown) may be connected to the input terminal of the power factor corrector 111.

The inverter 112 may control the switching frequency of the power supplied to the power transmission circuit 113 based on the DC power converted through the power factor corrector 111 to thereby control the power transmitted through the power transmission circuit 113. According to an embodiment, the inverter 112 may receive the link voltage as an input and convert it into AC.

By the inverting operation, a maximum voltage or a zero-volt voltage may be alternately applied to the power transmission circuit 113 at preset periods, and accordingly, a magnetic field may be generated from the power transmission circuit 113. The inverting frequency, i.e., the frequency of the AC waveform applied to the power transmission circuit 113, may be set to be a value ranging from 100 kHz to 205 kH or 6.78 MHz depending on the standard, but not limited thereto. If power is applied to the power transmission circuit 113, an induced magnetic field whose magnitude changes over time may be formed from the power transmission circuit 113, and thus power may be wirelessly transmitted.

The voltage of AC power output from the inverter 112 is denoted $V_p$. For example, $V_p$ may have a fixed frequency. The inverter 112 may adjust the magnitude of power delivered to the power transmission circuit 113 by changing the duty cycle D by the control circuit 115, so that the magnitude of power wirelessly transmitted from the power transmission circuit 113 may be adjusted.

According to various embodiments, the detection unit 114 may include various detection circuitry and detect a signal corresponding to a power signal transmitted to the electronic device 150 through the power transmission circuit 113. For example, the magnitude of power input to the detection unit 114 may be measured. The detection unit 114 may also be referred to as a sensor, and may detect the maximum voltage level of the power signal transmitted to the electronic device 150. The maximum voltage of the detected signal is a value proportional to the output voltage, and may correspond to, e.g., the output voltage of the receive-side IPT converter, that is, the magnitude of power applied to the electronic device 150. Accordingly, the control circuit 115 may identify the voltage applied to the electronic device 150, which is being wirelessly charged, based on the signal detected by the detection unit 114.

In various embodiments, the wireless power transmission device 100 and the electronic device 150 may include a communication circuit (e.g., the communication circuit 203 of FIG. 2) for in-band communication or out-band communication and, in this case, communication with the electronic device 150 may be performed during a subscription process. According to various embodiments, the wireless power transmission device 100 may communicate with the electronic device 150 until charging begins, and once charging commences, the wireless power transmission device 100 may stop communication with the electronic device 150. Thereafter, as set forth above, the wireless power transmission device 100 may adjust the magnitude of transmit power by determining the voltage applied to the electronic device 150 even without performing communication. In this case, when a change in the state of the electronic device 150 is detected, e.g., when a change in the load voltage of the electronic device 150 is detected, while communication is not performed, the wireless power transmission device 100 may resume communication to receive sensing data from the electronic device 150.

In various embodiments, the wireless power transmission device 100 may immediately perform wireless charging in response to, e.g., a start button input for wireless charging. In this case, in a state in which communication is not performed, the wireless power transmission device 100 may identify the voltage applied to the electronic device 150 based on the signal detected as described above, and determine the magnitude of power to be transmitted in response thereto. According to various embodiments, the wireless power transmission device 100 may adaptively adjust power for wireless charging in a load change situation even without performing communication.

According to various example embodiments, a wireless power transmission device 100 may comprise: a coil circuit (e.g., the power transmission circuit 113) configured to generate a power signal for transmission of power to an electronic device, an inverter configured to convert direct current (DC) power into alternating current (AC) power and provide the AC power to the coil circuit, a coil-type detection unit comprising circuitry disposed adjacent to the coil circuit and configured to detect a signal corresponding to the power signal, and a control circuit configured to adjust a switching frequency of the inverter or to change AC power output from the inverter based on the detected signal.

According to an example embodiment, the control circuit may be configured to compare a maximum magnitude of the detected signal with a threshold and adjust the switching frequency of the inverter for adjusting magnitude of AC power output from the inverter.

According to an example embodiment, the control circuit may be configured to maintain the switching frequency of the inverter based on the maximum magnitude of the detected signal corresponding to the threshold.

According to an example embodiment, the coil-type detection unit may include a coil wound around the coil circuit.

According to an example embodiment, the control circuit may be configured to change the switching frequency of the inverter to allow the maximum magnitude of the detected signal to correspond to the threshold using a pulse frequency modulation scheme.

According to various example embodiments, the wireless power transmission device 100 may further comprise: a power factor corrector comprising circuitry configured to output power factor-corrected DC power to the inverter, and a pulse width modulator (not shown) configured to vary a duty cycle.

According to an example embodiment, the control circuit may be configured to adjust a magnitude of power input to the inverter by controlling the power factor corrector based on the detected signal.

According to an example embodiment, the control circuit may be configured to control to maintain the switching frequency of the inverter upon adjusting output power of the power factor corrector based on the detected signal.

According to an example embodiment, the control circuit may be configured to adjust output power of the power factor corrector by varying the duty cycle by controlling the pulse width modulator and control the switching frequency of the inverter within a designated frequency range. For example, when the duty cycle is varied, the output power of the power factor corrector 111 may be adjusted and, in response to the adjustment of the output power, the switching frequency of the inverter may be controlled within a designated frequency range.

The power reception circuit of the electronic device may include one or more coils. An induced electromotive force may be generated by the magnetic field whose magnitude is varied according to times when it is formed around the coils, and the electronic device 150 may thereby receive power wirelessly. The rectifier may rectify the received alternating current (AC) power into a direct current (DC) waveform. Although not shown, a regulator (or DC/DC converter) may be added to regulate the rectified power output from the rectifier 152. The electronic device may further include a battery control converter (not shown) configured to control battery charging. The receive-side battery control converter is configured to be fully in charge of battery charging control due to advantages in battery voltage control performance and since a transmit-side platform operator and a receive-side platform operator are separated for wireless chargers.

The load 153 may refer, for example, to an output terminal of the rectified power (or converted power) or various hardware components in the electronic device 150.

Figure 4:
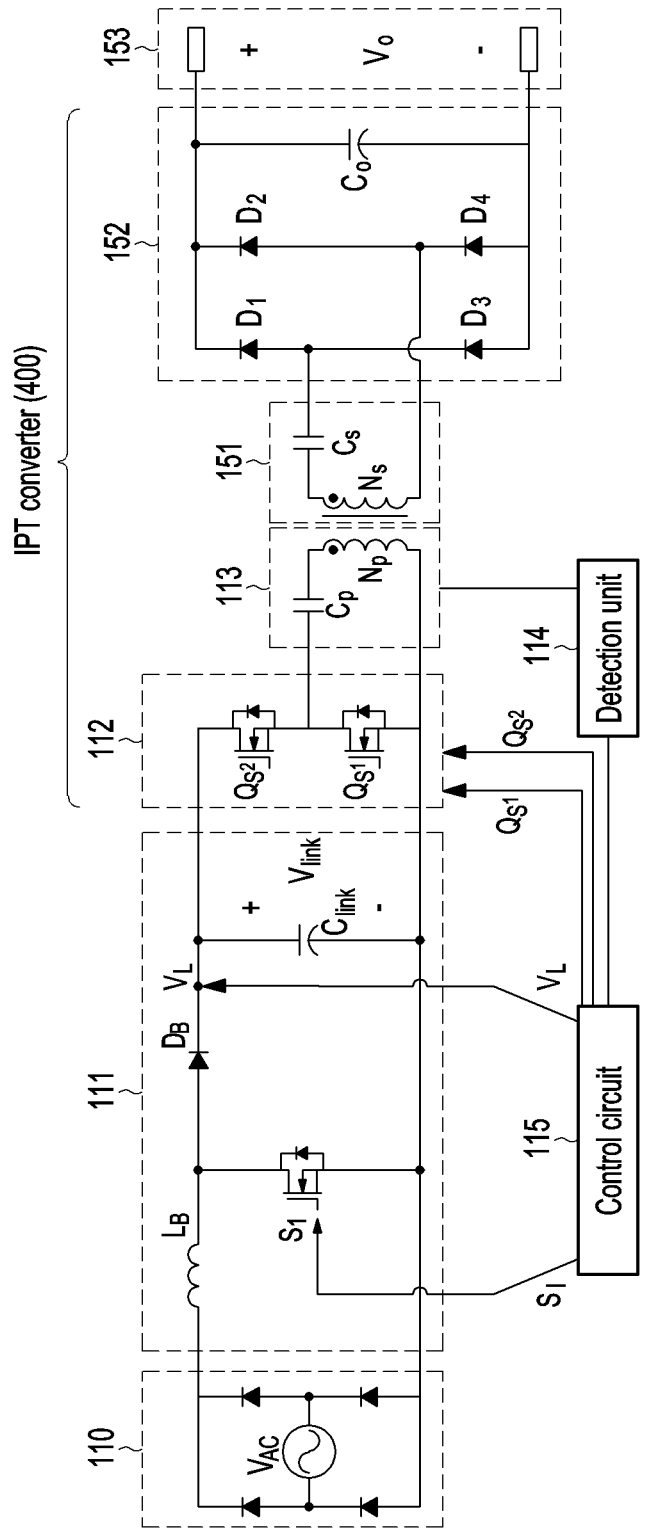
FIG. 4 is a circuit diagram illustrating an example wireless charging system according to various embodiments.

FIG. 4 is a circuit diagram illustrating an example circuit configuration of a wireless charging system according to various embodiments.

Referring to FIG. 4, a configuration including the inverter 112 and the power transmission circuit 113 of the wireless power transmission device 100, and the power reception circuit 151 and the rectifier 152 of the electronic device 150 may be referred to as an IPT converter 400. A control algorithm for efficiently transferring power for battery charging may be applied to the IPT converter 400. In the IPT converter 400, a control operation for maximum power transmission is performed, and the output voltage information for the IPT converter 400 needs to be transmitted to the wireless power transmission device 100, which is the transmit side, in real time so as to enable wireless charging with the maximum efficiency. However, in various embodiments to prevent and/or reduce delay due to the transmission speed of the communication signal, it may be rendered possible to perform wireless charging with the maximum efficiency even in a state where communication is not performed through the communication circuit. For example, since the output voltage of the IPT converter 400 is a value proportional to the maximum voltage of the signal detected by the detection unit 114, the output voltage of the IPT converter 400, e.g., the power applied to the electronic device 150, may be identified by detecting the maximum voltage by the detection unit 114.

Referring to FIG. 4, the rectifier 110 may be implemented as a circuit using a bridge rectifier circuit including four diodes to convert an AC power source (e.g., $V_{AC}$) into direct current. The DC power output from the rectifier 110 may be transferred to the power factor corrector 111.

A capacitor in the power factor corrector 111 may be connected to the power transmission circuit 113, and may have a capacitance of $C_{link}$. Further, the duty cycle (e.g., $S_1$) of the power factor corrector 111 may be controlled by the control circuit 115, and a voltage (e.g., $V_L$) for adjusting the link voltage (e.g., $V_{link}$), which is the input voltage to the inverter 112, may be applied by the control circuit 115. The voltage (e.g., $V_L$) for adjusting the link voltage (e.g., $V_{link}$) applied by the control circuit 115 may be determined based on the signal detected by the detection unit 114.

The power transmission circuit 113 may have a capacitance of $C_P$ and the number $N_P$ of coil turns. The power reception circuit 151 of the electronic device 150 may have a capacitance of $C_S$ and the number $N_S$ of coil turns. The rectifier 152 may be implemented as a circuit using a bridge rectifier circuit including four diodes, and may have a capacitance of $C_O$. Accordingly, the output voltage of the rectifier 152, that is, the output voltage of the IPT converter 400, may be Vo. As described above, according to various embodiments, the control circuit 115 may use the signal detected by the detection unit 114 to identify Vo which corresponds to the output voltage of the rectifier 152 of the electronic device 150, i.e., the output voltage of the IPT converter 400. Here, the output voltage Vo of the rectifier 152 may correspond to the input voltage of the load 153, and the output voltage Vo may be referred to as a load voltage of the electronic device 150.

According to an embodiment, the detection unit 114 may detect the maximum voltage (e.g., $V_{sen\_peak}$) of the power proportional to the output voltage Vo. For example, the signal detected by the detection unit 114 may be a signal having the maximum magnitude and may be a value proportional to the output voltage.

According to an embodiment, the control circuit 115 may control the switching frequency of the inverter 112 based on the signal detected by the detection unit 114. For example, the control circuit 115 may compare a threshold with the maximum magnitude (e.g., $V_{sen\_peak}$) of the signal detected by the detection unit 114. If the maximum magnitude (e.g., $V_{sen\_peak}$) of the detected signal is more than or less than the threshold, the control circuit 115 may control the switching frequency of the inverter 112 based on the comparison result. For example, the control circuit 115 may output, to the inverter 112, a control signal indicating how much and how to adjust the switching frequency of the inverter 112 based on the comparison result.

In this case, the control circuit 115 may control the operation of the inverter 112 to be split into two branch circuits using control signals (e.g., $Q_{S1}$ and $Q_{S2}$ signals). For example, the $Q_{S1}$ and $Q_{S2}$ of the inverter 112 may be alternately turned on by the control signals (e.g. $Q_{S1}$ and $Q_{S2}$ signals). Accordingly, the inverter 112 may transfer the power having a voltage of $V_p$ to the power transmission circuit 113, and the coil of the power transmission circuit 113 may form a magnetic field.

According to various embodiments, in a case where the voltage (e.g., $V_L$) for adjusting the link voltage (e.g., $V_{link}$), which is the input voltage to the inverter 112, is applied by the control circuit 115, the switching frequency of the inverter 112 is not varied, but remain fixed while link voltage adjustment is performed. Accordingly, according to various embodiments, it is possible to obtain a high gain even with a tiny variation in switching frequency by rapidly changing the link voltage, which is the output-side voltage to the power factor corrector 111. As such, since a high gain may be obtained even without significantly varying the switching frequency by controlling the link voltage which is the output voltage of the power factor corrector 111, it is possible to achieve a flexible design for the coils of the wireless charging system. It is also possible to attain optimal wireless charging under the restriction causing the switching frequency variation range of the inverter 112 to narrow down due to relatively significant leakage inductance of the transmit/receive-side coils in the electromagnetic induction-type wireless charging system.

Figure 5:
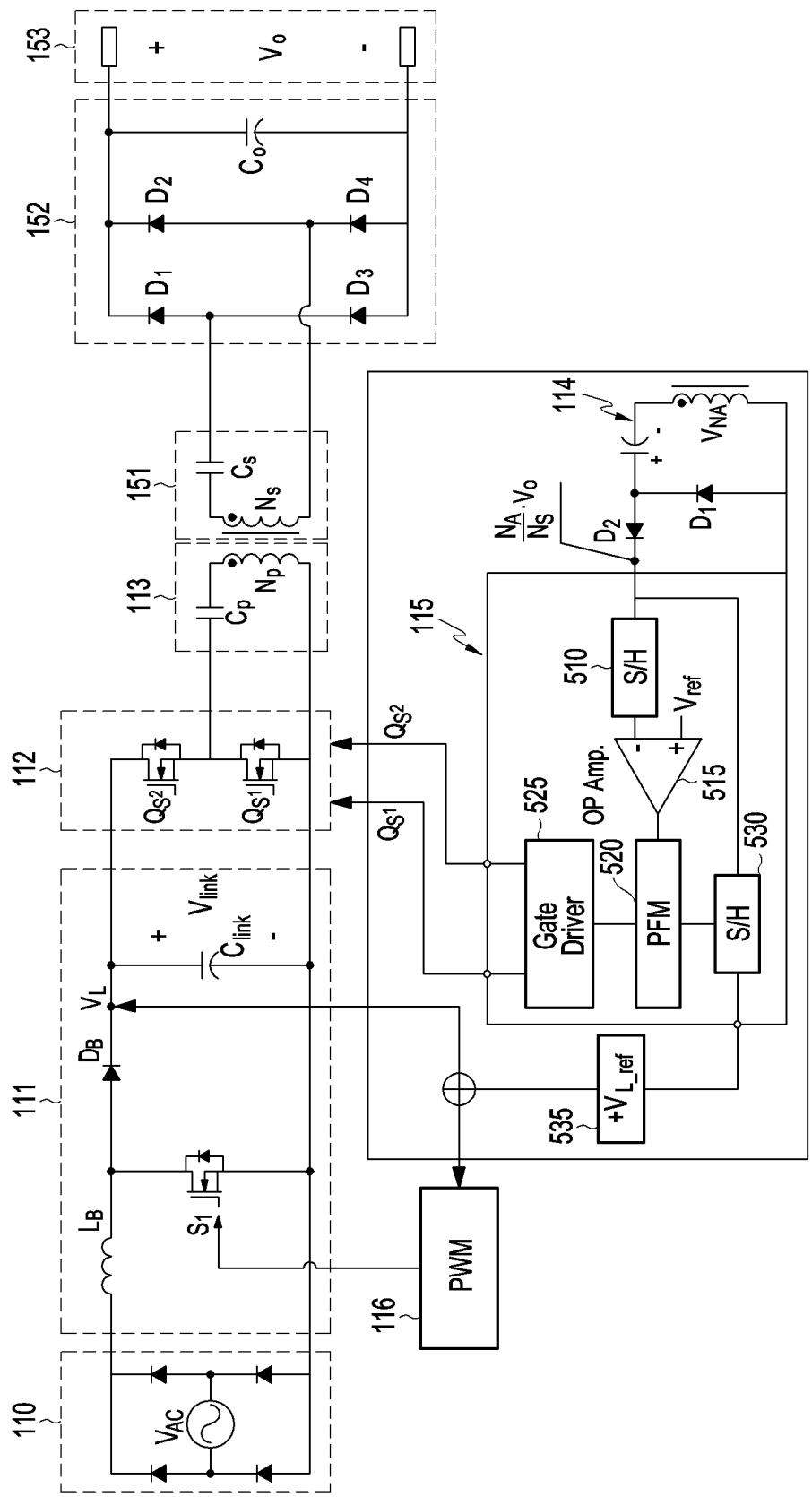
FIG. 5 is a circuit diagram illustrating an example control circuit and a detection unit according to various embodiments.

FIG. 5 is a circuit diagram illustrating an example configuration of a control circuit and a detection unit according to various embodiments.

Referring to FIG. 5, the detection unit 114 is of a coil type, is disposed adjacent to the coil of the power transmission circuit 113, and may include a coil, one capacitor, and two diodes. If power having a voltage of $V_p$ which is the output voltage of the inverter 112 is transmitted through the coil of the power transmission circuit 113, the magnitude of the voltage applied to the additional coil corresponding to the detection unit 114 may be detected. This is described in greater detail below with reference to FIG. 6.

Figure 6:
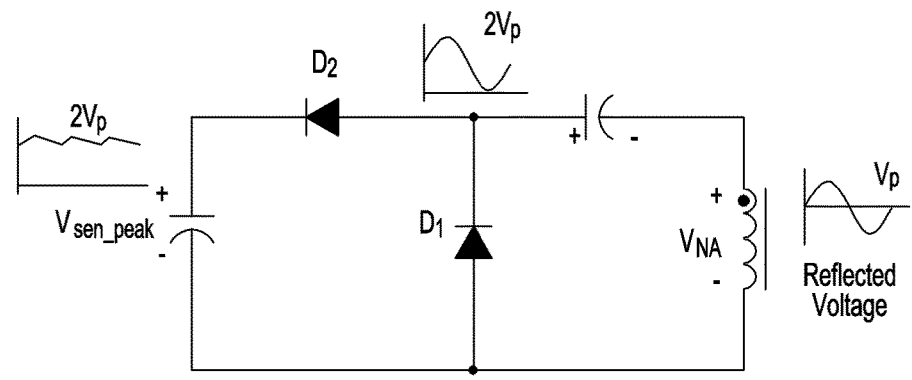
FIG. 6 is a circuit diagram illustrating an example configuration of a detection unit according to various embodiments.

FIG. 6 is a circuit diagram illustrating an example configuration of a detection unit according to various embodiments.

Referring to FIG. 6, if the voltage applied to the additional coil is $V_{NA}$, the maximum voltage (e.g., $V_{sen\_peak}$) for the applied voltage $V_{NA}$ may be detected using one capacitor and two diodes.

For example, the maximum voltage (e.g., $V_{sen\_peak}$) for the applied voltage $V_{NA}$ may be calculated as in Equation 1 below.

$$V_{sen\_peak}=K*(N_A/NS)*V0$$

In Equation 1, K is a constant, Vo denotes the output voltage, $N_A$ denotes the number of turns of the additional coil, and $N_S$ may denote the number of turns of the receive-side coil. Here, since the output voltage Vo corresponds to the output voltage of the rectifier 152 of the electronic device 150, it may be identified that the maximum voltage (e.g., $V_{sen\_peak}$) is proportional to the output voltage Vo. Accordingly, the wireless power transmission device 100 may identify the output voltage Vo applied to the electronic device 150 by detecting the maximum voltage (e.g., $V_{sen\_peak}$) and may thus adjust the magnitude of the transmit power to the electronic device 150.

The signal detected by the detection unit 114 may represent the maximum voltage (e.g., $V_{sen\_peak}$), and the control circuit 115 may be provided with a maximum voltage (e.g., $V_{sen\_peak}$) having a value of K*(NA/NS)*Vo.

According to an embodiment, as illustrated in FIG. 5, the control circuit 115 may include a first sample and hold (S/H) circuit 510, a second S/H circuit 530, an operational amplifier 515, a pulse frequency modulation (PFM) 520, and a gate driver 525. The maximum voltage (e.g., $V_{sen\_peak}$) may be passed through the first S/H circuit 510 and compared with an internal voltage $V_{ref}$ which is the threshold, through the operational amplifier 515 (e.g., an OP amp) which corresponds to a comparator. If the maximum value (e.g., $V_{sen\_peak}$) is more or less than the interval voltage $V_{ref}$ due to a load variation, it may be controlled to allow the maximum value (e.g., $V_{sen\_peak}$) to be equal to the interval voltage $V_{ref}$, which is the threshold, by a tiny frequency variation of gate applied to the inverter 112 using the PFM 520.

Accordingly, it is possible to change the switching frequency of the inverter 112 by outputting the control signals (e.g., $Q_{S1}$ and $Q_{S2}$ signals) to the inverter 112 through a gate driver 525. For example, the control circuit 115 may control to change the switching frequency so that the maximum value (e.g., $V_{sen\_peak}$) becomes equal to the interval voltage $V_{ref}$ which is the threshold. By so doing, it is possible to adjust the transmit power in real time adaptively to the load variations even without feedback through reception of a communication signal.

According to an embodiment, the control circuit 115 may adjust the transmission power by varying the switching frequency of the inverter 112 so as to change the AC power output from the inverter 112. According to an embodiment, since the input voltage of the inverter 112 is a link voltage that is the output voltage of the power factor corrector 111, it is possible to adjust the transmission power by adjusting the output voltage (e.g., $V_{link}$) of the power factor corrector 111. According to an embodiment, the control circuit 115 may use the maximum value (e.g., $V_{sen\_peak}$), which has gone through the second S/H circuit 530, to determine $V_{L\_ref}$ for adjusting the output voltage (e.g., $V_{link}$) of the power factor corrector 111.

For example, the control circuit 115 may output the control voltage (e.g., VL) to the power factor corrector 111 based on the difference $V_{L\_ref}$ between the maximum value (e.g., $V_{sen\_peak}$) and the interval voltage $V_{ref}$ in determining how much to adjust the output voltage (e.g., $V_{link}$) of the power factor corrector 111. Thus, the power factor corrector 111 may output the link voltage (e.g., $V_{link}$), which has been adjusted by the control voltage (e.g., VL), to the inverter 112, and the inverter 112 may transfer the power corresponding to the adjusted link voltage to the power transmission circuit 113, so that the magnitude of the transmission power may be adjusted. The so adjusted power may be transferred to the power transmission circuit 113, and the coil of the power transmission circuit 113 may form a magnetic field in response to the adjusted power. Accordingly, the power reception circuit 151 may receive the adjusted power.

According to an embodiment, the control circuit 115 may adjust the transmission power by adjusting the output voltage (e.g., $V_{link}$) of the power factor corrector 111 or the switching frequency of the inverter 112 or, alternatively, may adjust the transmission power by controlling the duty cycle of the power factor corrector 111 using the PWM 116.

Figure 7:
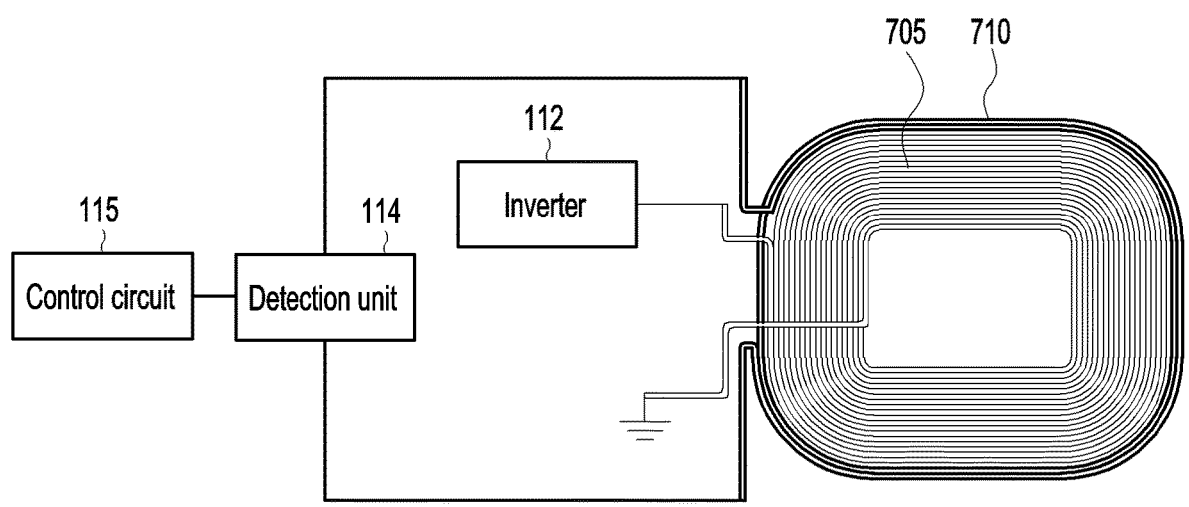
FIG. 7 is a diagram illustrating a connection relationship with a coil structure according to various embodiments.

FIG. 7 is a diagram illustrating an example connection relationship with a coil structure according to various embodiments.

Referring to FIG. 7, the inverter 112 may be connected to both terminals or an intermediate lead line of the coil 705. A separate conductive coil winding 710 may be provided inside or outside the conductive coil winding 705. FIG. 7 illustrates that the coil wire is shaped as a circle. However, one conductive wire may be shaped to be wound from the inside to the outside, indeed. In this case, although both the terminals of the additional coil winding 710 are connected to the detection unit 114, the configuration including the additional coil winding 710 may also be referred to as the detection unit 114.

If the configuration including the additional coil winding 710 is referred to as the detection unit 114, the detection unit 114 may include a component for detecting the maximum voltage from the power signal detected through both the terminals of the additional coil winding 710. For example, a diode and a capacitor, respectively, as components for detecting the maximum voltage, may be connected to both the terminals of the additional coil winding 710. Alternatively, if the additional coil winding 710 is referred to as a detection unit, both the terminals of the additional coil winding 710 may be configured to be connected to the control circuit 115.

Figure 8:
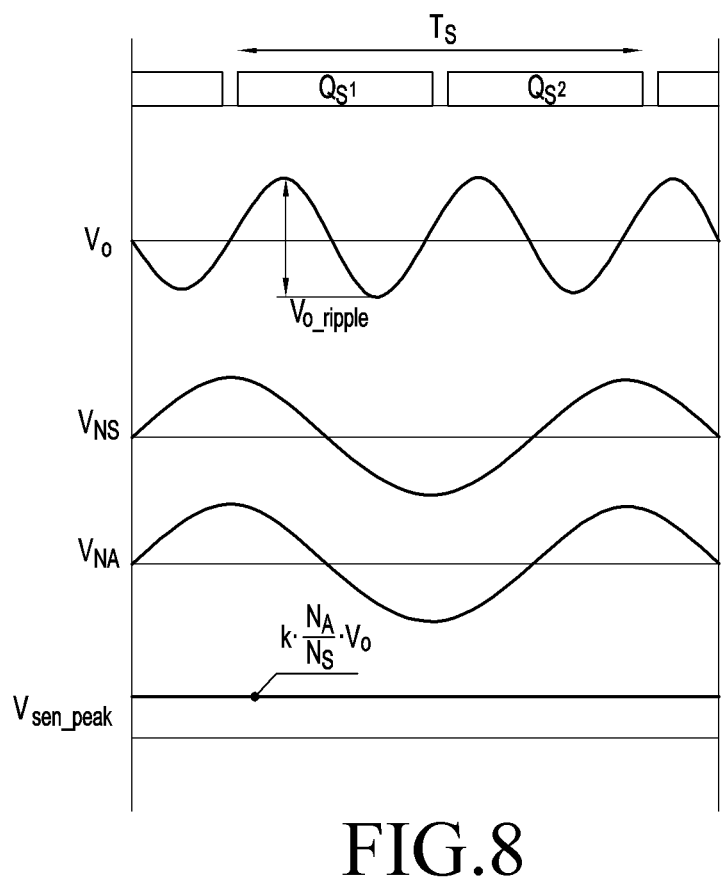
FIG. 8 is a diagram illustrating main waveforms related to detection of an output voltage according to various embodiments.

FIG. 8 is a diagram illustrating main waveforms related to detection of an output voltage according to various embodiments.

Referring to FIG. 8, as the gates of the inverter 112 are alternately turned on in response to control signals (e.g., QS1 and QS2 signals) applied from the control circuit 115, a sinusoidal output voltage Vo may be output from the output terminal of the rectifier 152 of the electronic device 150. Further, as the voltage applied to the coil of the power reception circuit 151 of the electronic device 150, a sinusoidal output voltage $V_{NS}$ may also be output. In contrast, as the voltage applied to the coil of the detection unit 114 of the wireless power transmission device 100, a sinusoidal output voltage $V_{NA}$ may be output. As illustrated in FIG. 8, it may be identified that the output voltage $V_{NS}$ is proportional to the output voltage $V_{NA}$, and the waveform for the maximum value (e.g., $V_{sen\_peak}$) having a constant value may be obtained through the above-described Equation 1 based on the proportional relationship between the output voltage $V_{NS}$ and the output voltage $V_{NA}$.

Figure 9:
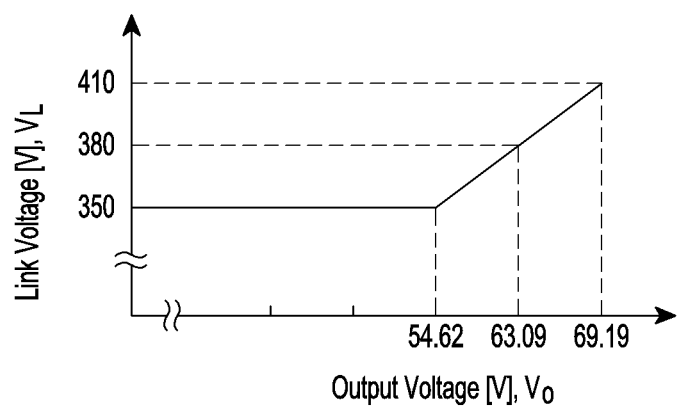
FIG. 9 is a graph illustrating a relationship with an output voltage of a wireless power transmission device according to an output voltage of a power factor corrector according to various embodiments.

FIG. 9 is a graph illustrating a relationship with an output voltage of a wireless power transmission device according to an output voltage of a power factor corrector according to various embodiments.

FIG. 9 illustrates an example in which the output voltage (e.g., Vo) is varied by changing the link voltage (e.g., $V_{link}$) of the power factor corrector 111, with the switching frequency of the inverter 112 fixed. As illustrated in FIG. 9, the output voltage is proportional to the link voltage (e.g., $V_{link}$) of a predetermined value or more. Thus, it is possible to control the output voltage (e.g., Vo) of the wireless power transmission device by controlling the link voltage (e.g., $V_{link}$). For example, upon starting transmission of the power received from the power source 110 through the power transmission circuit (e.g., coil) 113 to the power reception circuit 151 of the electronic device 150, the wireless power transmission device 100 may start the power transmission by applying a designated link voltage (e.g., $V_{link}$) to the power factor corrector 111. For example, the wireless power transmission device 100 may set a specific frequency in the switching frequency range of the inverter 112, as the switching frequency, after applying the designated link voltage (e.g., $V_{link}$) to the power factor corrector 111 and perform initial driving.

In this case, the wireless power transmission device 100 may communicate with the electronic device 150 through the communication circuit 203. The wireless power transmission device 100 may receive identification information about the electronic device 150, rated voltage information, rated power information, information about the maximum magnitude of current or voltage permitted at the output end of the rectifier, and information about the capability of the electronic device 150. As such, after receiving the information for the electronic device 150, the wireless power transmission device 100 may charge the electronic device 150. The wireless power transmission device 100 may communicate with the electronic device 150 until charging begins, and once charging commences, the wireless power transmission device 100 may stop communication with the electronic device 150. Thereafter, the wireless power transmission device 100 may adjust the magnitude of transmit power by determining the status of the power applied to the electronic device 150 even without performing communication.

For example, when the wireless power transmission device 100 identifies the output voltage (e.g., Vo) above the threshold, the wireless power transmission device 100 may adjust the output voltage (e.g., Vo) by reducing the link voltage (e.g., $V_{link}$). To that end, the wireless power transmission device 100 may identify the voltage applied to the electronic device 150, which performs wireless charging, based on the signal detected from the detection unit 114, which is in the form of an additional coil and disposed adjacent to the power transmission circuit 113. The voltage applied to the electronic device 150 may correspond to the output voltage (e.g., Vo) of the wireless power transmission device 100. Thus, the wireless power transmission device 100 may identify the output voltage (e.g., Vo) for the electronic device 150 even without performing communication with the electronic device 150 and may thereby adjust the link voltage (e.g., $V_{link}$) to maintain the output voltage (e.g., Vo) in a designated range.

Figure 10:
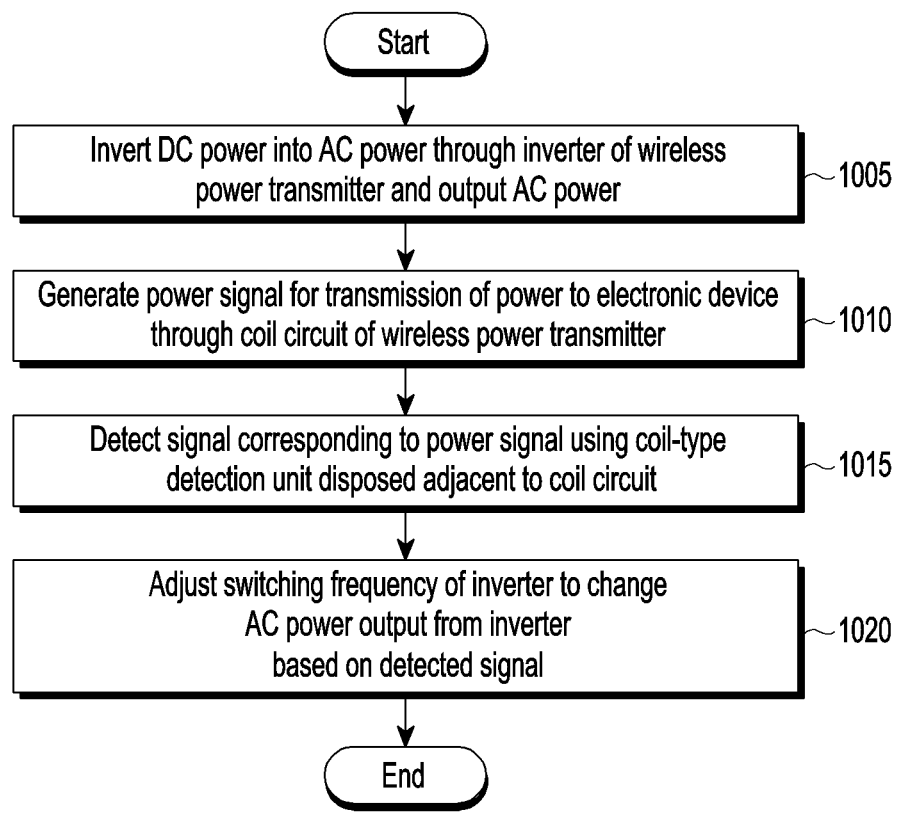
FIG. 10 is a flowchart illustrating example operations of a wireless power transmission device according to various embodiments.

FIG. 10 is a flowchart illustrating example operations of a wireless power transmission device according to various embodiments.

FIG. 10 illustrates example operations for performing load variation adaptive wireless charging, and the operation method may include operations 1005 to 1020. Each step/operation of the operation method may be performed by at least one of a wireless power transmission device (e.g., the wireless power transmission device 100 of FIGS. 1 and 2) or at least one processor (e.g., the control circuit 202 of FIG. 2) or the control circuit 115 of FIG. 3) of the wireless power transmission device. According to an embodiment, at least one of operations 1005 to 1020 may be omitted or changed in order or may add other operations.

Referring to FIG. 10, in operation 1005, the wireless power transmission device 100 may invert DC power to AC power through the inverter 112 (e.g., the inverter 112 of FIG. 3) of the wireless power transmission device 100 and output the AC power.

In operation 1010, the wireless power transmission device 100 may generate a power signal for transmission of the power to the electronic device 150 through a coil circuit (e.g., the power transmission circuit 113 of FIG. 3) of the wireless power transmission device 100.

In operation 1015, the wireless power transmission device 100 may detect a signal corresponding to the power signal using a coil-type detection unit (e.g., the detection unit 114 of FIG. 3) disposed adjacent to the coil circuit (e.g., the power transmission circuit 113 of FIG. 3).

In operation 1020, the wireless power transmission device 100 may adjust the switching frequency of the inverter 112 to change the AC power output from the inverter 112, based on the detected signal.

According to an embodiment, the operation of adjusting the switching frequency of the inverter 112 may include the operation of comparing the maximum magnitude of the detected signal with a threshold and the operation of adjusting the switching frequency of the inverter 112 based on a result of the comparison. For example, if the maximum magnitude (e.g., $V_{sen\_peak}$) of the detected signal is larger or smaller than the threshold (e.g., the interval voltage $V_{ref}$), the wireless power transmission device 100 may adjust the switching frequency of the inverter 112 so that the maximum magnitude (e.g., $V_{sen\_peak}$) becomes identical to the threshold (e.g., the interval voltage $V_{ref}$). According to an embodiment, the wireless power transmission device 100 may adjust the output voltage of the power factor corrector 111 which is the link voltage corresponding to the voltage input to the inverter 112 so as to adjust the magnitude of the AC power output from the inverter 112.

According to an embodiment, in a case where the result of comparison reveals that the maximum magnitude of the detected signal corresponds to the threshold, the method may further include the operation of maintaining the switching frequency of the inverter 112.

According to an embodiment, the operation of adjusting the switching frequency of the inverter 112 may include the operation of changing the switching frequency of the inverter 112 to allow the maximum magnitude of the detected signal to correspond to the threshold using a pulse frequency modulation scheme.

According to an embodiment, the operation of adjusting the switching frequency of the inverter 112 may include the operation of adjusting the magnitude of the power input to the inverter 112 by controlling the power factor corrector 111 (e.g., the power factor corrector 111 of FIG. 3), which outputs the power factor-corrected DC power to the inverter 112, based on the detected signal. For example, since the output voltage output from the power factor corrector 111 corresponds to the input voltage to the inverter 112, it is possible to adjust the transmission power by adjusting the link voltage (e.g., $V_{link}$) which corresponds to the input to the inverter 112.

According to an embodiment, the method may further include the operation of maintaining the switching frequency of the inverter 112 upon adjusting the output power of the power factor corrector 111 based on the detected signal. For example, when the output voltage of the power factor corrector 111 is adjusted, the switching frequency of the inverter 112 may be not varied but fixed.

According to an embodiment, the operation of adjusting the switching frequency of the inverter 112 may include the operation of adjusting the output power of the power factor corrector 111 by varying the duty cycle and the operation of controlling the switching frequency of the inverter 112 within a designated frequency range. For example, when the duty cycle is varied, the output power of the power factor corrector 111 may be adjusted and, in response to the adjustment of the output power, it may be possible to control the switching frequency of the inverter 112 within a designated frequency range.

Figure 11:
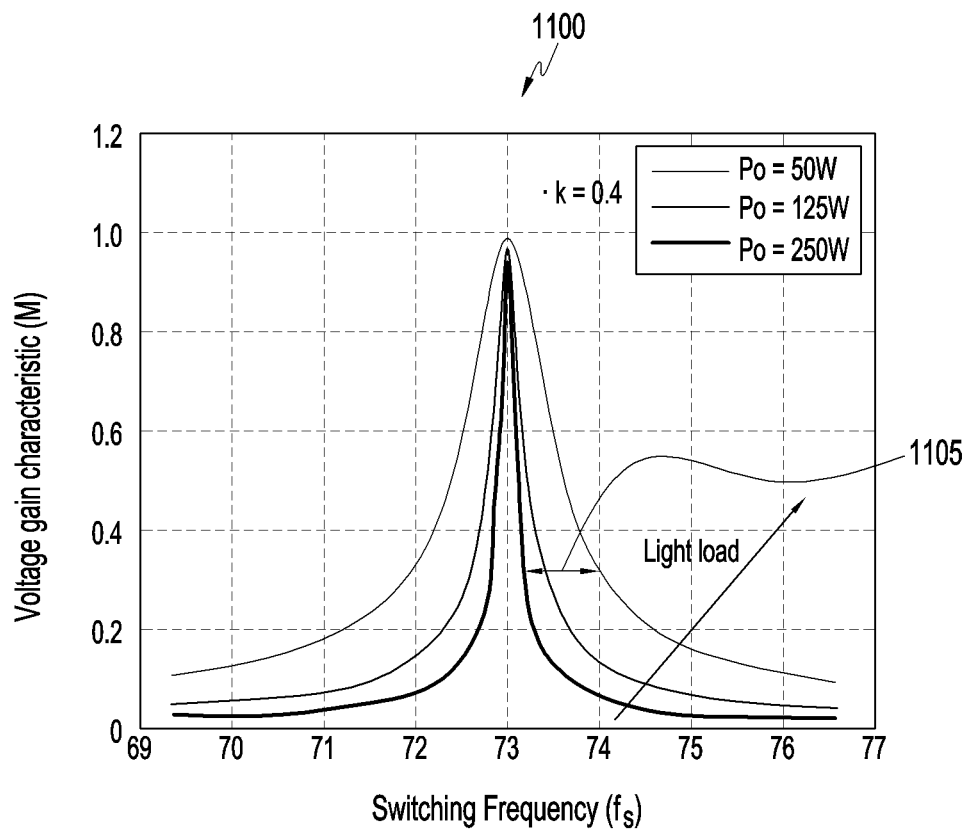
FIG. 11 is a graph illustrating switching frequency variable control according to load variations according to various embodiments.

FIG. 11 is a graph 1100 illustrating example switching frequency variable control according to load variations according to various embodiments.

Referring to FIG. 11, the wireless power transmission device 100 may control an operation for varying the switching frequency fs of the inverter 112 for the purpose of constant voltage regulation in response to input/output characteristics variations due to load variations.

According to various embodiments, a magnetic material may be designed considering the variable range of the switching frequency to meet constant voltage control in the entire load range. If the variable range of the switching frequency increases, the circulating current, among the components of the resonant current, occupies a more proportion, so that switching loss and loss in core may increase. For example, as illustrated in FIG. 11, it may be identified that first power (e.g., Po=50 W) to third power (e.g., Po=250 W) may have different switching frequency variable ranges 1105 with respect to the same gain, and that the switching frequency variable range for the third power (e.g., Po=250 W) is narrower than the switching frequency variable range for the first power (e.g., Po=50 W). Here, it is shown that the switching frequency variable range 1105 may be constant voltage controlled through varying the switching frequency due to load variations.

Thus, a method in which the gain is significantly varied even with a tiny variation in switching frequency may be used to minimize loss occurring when the switching frequency variable range is large. For example, a stepper input/output characteristic curve for the IPT converter 400 may be output by reducing the inductor ratio k (=Lm/Lr), i.e., a ratio between magnetizing inductance and leakage inductance. This is described in greater detail below with reference to FIG. 12.

Figure 12:
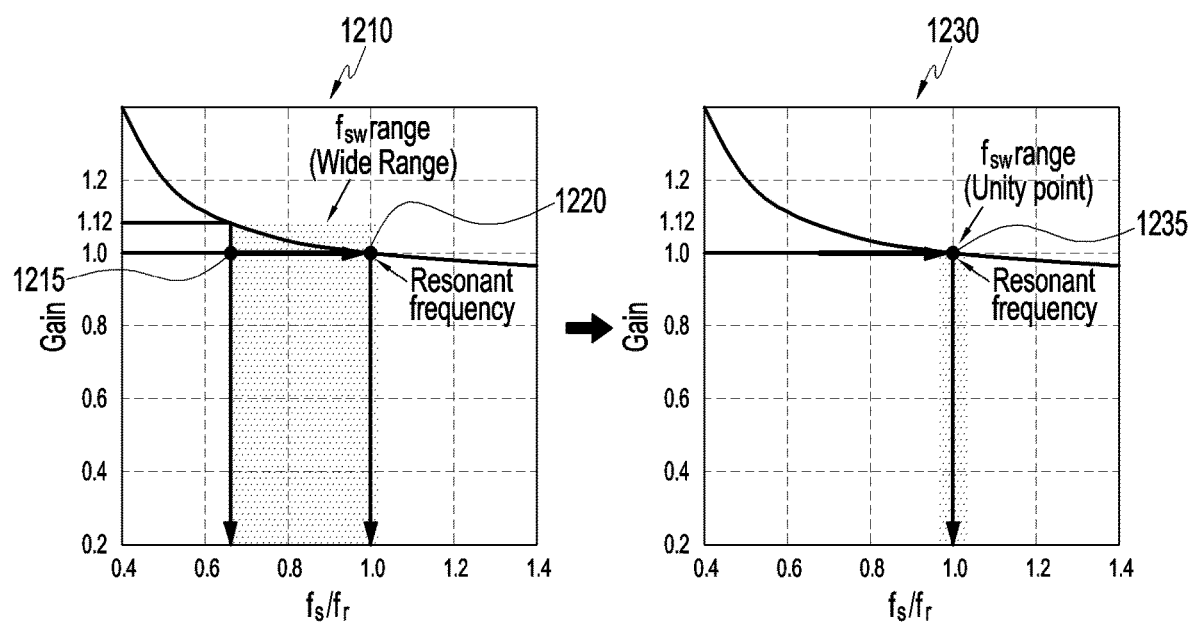
FIG. 12 are graphs illustrating changes in gain due to variations in the output voltage of a power factor corrector according to various embodiments.

FIG. 12 are graphs illustrating changes in gain due to variations in the output voltage of a power factor corrector according to various embodiments.

Referring to FIG. 12, the wireless power transmission device 100 may vary the switching frequency of the inverter 112 to control the constant voltage characteristics according to load changes. First, a first graph 1210 illustrates changes in the switching frequency of the inverter 112 within a designated range. For example, in the first graph 1210, a first point 1215 may be a constant voltage control point before the load changes, and a second point 1220 is a constant voltage control point within the input/output gain characteristic curve changed by the load change. For desired constant voltage control according to the load change, the wireless power transmission device 100 may perform control to change the switching frequency from the first point 1215 to the second point 1220.

To control the transmission power without varying the switching frequency of the inverter 112, the wireless power transmission device 100 may adjust the transmission power to the electronic device 150 by varying the output voltage of the power factor corrector 111. In the second graph 1230, the wireless power transmission device 100 may perform constant voltage control through varying the link voltage without varying the switching frequency of the inverter 112 although the input/output gain curve is changed due to the load variation, e.g., while maintaining the switching frequency to a fixed point, e.g., the third point 1235. As such, as constant voltage control may be performed even while the switching frequency of the inverter 112 is maintained, it is possible to reduce conducting loss due to the circulating current, facilitate design of a magnetic material, and enhance the power density of the wireless charging system.

Figure 13:
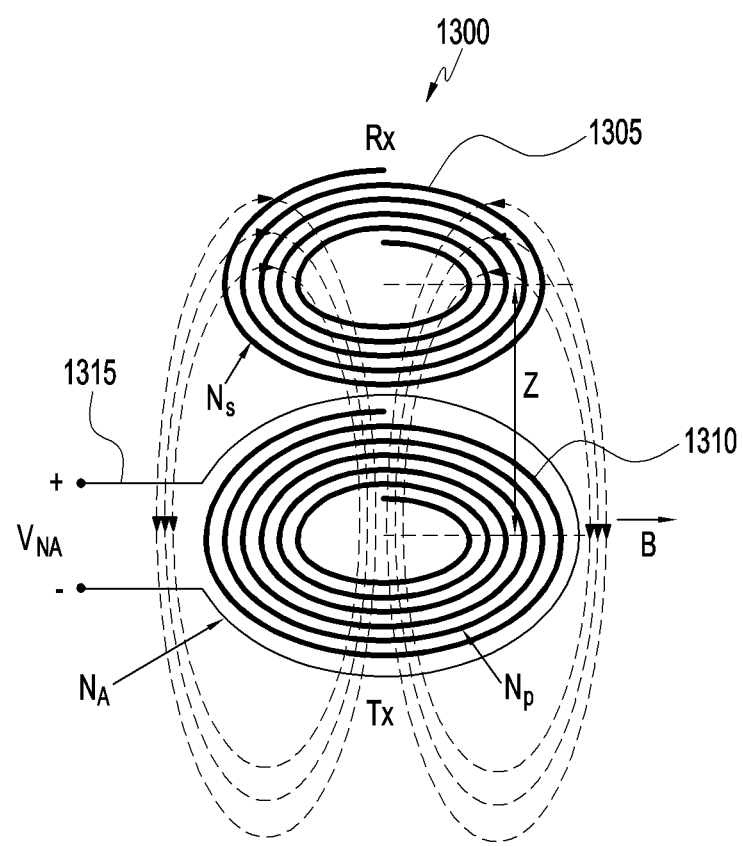
FIG. 13 is a diagram illustrating an example of an additional coil structure according to various embodiments.

FIG. 13 is a diagram illustrating an example of an additional coil structure 1300 according to various embodiments.

Referring to FIG. 13, in a TX, which is the wireless power transmission device 100, one or more primary coils 1310 and an additional coil 1315 surrounding the primary coil 1310 may be disposed and, in an RX which is the electronic device 150, a secondary coil 1305 may be disposed. When the power transfer of the wireless power transmission device 100 follows the induction scheme, if the intensity (or power) of the current flowing through the primary coil 1310 is changed, the magnetic field Z passing through the primary coil 1310 may be changed by the power. The so changed magnetic field Z may generate an induced electromotive force in the secondary coil 1305 in the electronic device 150. Here, the respective numbers of turns of the transmission coil, which operates as the primary coil, the reception coil, which operates as the secondary coil, and the additional coil 1315, which detects the signal used to identify the power applied to the electronic device 150, may be $N_P$, $N_S$, and $N_A$, respectively.

Figure 14A:
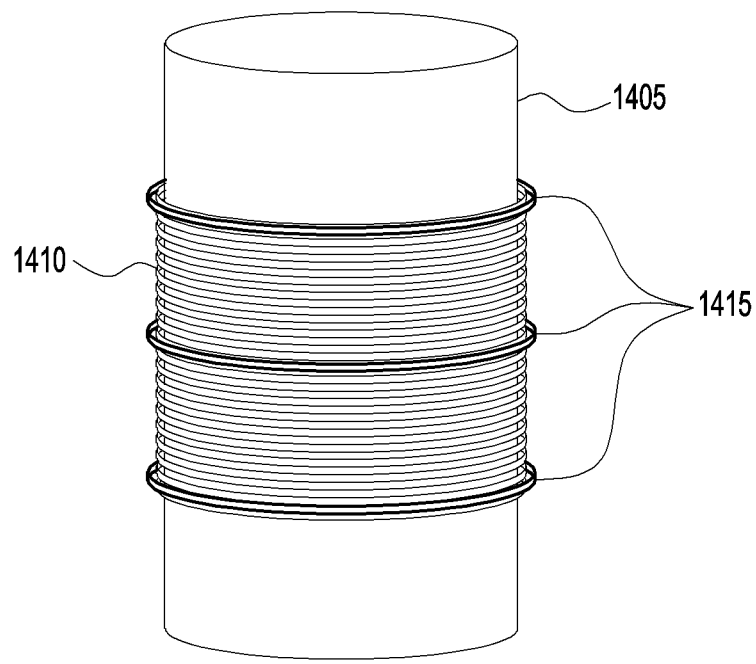
FIG. 14A is a diagram illustrating an example cylindrical coil structure according to various embodiments.

FIG. 14A is a diagram illustrating an example cylindrical coil structure 1405 according to various embodiments. Referring to FIG. 14A, the coil structure may have a cylindrical shape 1410 in which one conductive wire is wound around a rod structure 1405. In this case, the additional coil 1415 may be shaped to be wound around an intermediate, upper, or lower portion of the conductive winding. Although FIG. 14A illustrates an example of a cylindrical conductive winding, the shape may not be limited thereto.

Figure 14B:
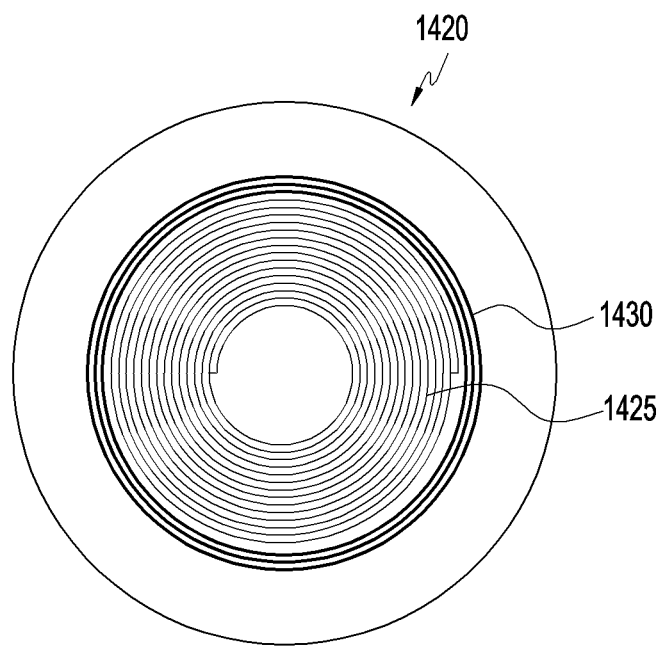
FIG. 14B is a diagram illustrating an example planar coil structure according to various embodiments.

FIG. 14B is a diagram illustrating an example planar coil structure 1420 according to various embodiments. Referring to FIG. 14B, a coil structure may be formed in a planar, annular spiral structure. A separate conductive coil winding 1430 may be disposed inside or outside a conductive coil winding 1425. In the planar coil structure, the coils are formed on a substrate, and may be provided in a multi-coil structure. For example, a first coil which has a first number of turns (number of windings) and a second coil which has a second number of turns may be disposed, and an additional coil 1430 for detecting the magnitude of power may be disposed on the outermost side. Alternatively, the additional coil 1430 may be disposed on the innermost side of the coil 1425.

As such, the set of coils may have a multi-coil structure having one or more coils and, as shown in FIG. 14B, the coils in the set including the additional coil may not overlap each other. FIG. 14b illustrates merely one example, and the coil set may not necessarily be limited as having two or three coils.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device 150). For example, a processor (e.g., the processor 120) of the machine (e.g., the electronic device 150) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various example embodiments of the disclosure, there may be provided a storage medium storing instructions configured to be executed by at least one processor to enable the at least one processor to perform at least one operation. The at least one operation may comprise inverting DC power into AC power through an inverter of a wireless power transmission device and outputting the AC power, generating a power signal for transmission of power to an electronic device through a coil circuit of the wireless power transmission device, detecting a signal corresponding to the power signal using a coil-type detection unit disposed adjacent to the coil circuit, and adjusting a switching frequency of the inverter to change AC power output from the inverter based on the detected signal.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A wireless power transmission device, comprising:
   a coil circuit configured to generate a power signal for transmission of power to an electronic device;
   an inverter configured to convert direct current (DC) power into alternating current (AC) power and provide the AC power to the coil circuit;
   a coil-type detection unit comprising a coil disposed adjacent to the coil circuit and configured to detect a signal corresponding to the power signal;
   a control circuit configured to adjust a switching frequency of the inverter to change AC power output from the inverter based on the detected signal;
   a power factor corrector comprising circuitry configured to output power factor-corrected DC power to the inverter; and
   a pulse width modulator configured to vary a duty cycle,
   wherein the control circuit is further configured to adjust the power factor-corrected DC power by varying the duty cycle by controlling the pulse width modulator and to control the switching frequency of the inverter within a designated frequency range.

2. The wireless power transmission device of claim 1, wherein the control circuit is further configured to compare a maximum magnitude of the detected signal with a threshold and adjust the switching frequency of the inverter.

3. The wireless power transmission device of claim 1, wherein the control circuit is further configured to maintain the switching frequency of the inverter based on a maximum magnitude of the detected signal corresponding to a threshold.

4. The wireless power transmission device of claim 1, wherein the coil-type detection unit includes the coil wound around the coil circuit.

5. The wireless power transmission device of claim 1, wherein the control circuit is further configured to change the switching frequency of the inverter to allow a maximum magnitude of the detected signal to correspond to a threshold using a pulse frequency modulation scheme.

6. The wireless power transmission device of claim 1, wherein the control circuit is further configured to adjust a magnitude of power input to the inverter by controlling the power factor corrector based on the detected signal.

7. The wireless power transmission device of claim 1, wherein the control circuit is further configured to maintain the switching frequency of the inverter upon adjusting the power factor-corrected DC power based on the detected signal.

8. A method for wireless charging by a wireless power transmission device, the method comprising:
   inverting direct current (DC) power into alternating current (AC) power through an inverter of the wireless power transmission device and outputting the AC power;
   generating a power signal for transmission of power to an electronic device through a coil circuit of the wireless power transmission device;
   detecting a signal corresponding to the power signal using a coil-type detection unit disposed adjacent to the coil circuit; and
   adjusting a switching frequency of the inverter to change AC power output from the inverter based on the detected signal,
   wherein adjusting the switching frequency of the inverter includes:
      adjusting a magnitude of power input to the inverter by controlling a power factor corrector outputting power factor-corrected DC power to the inverter, based on the detected signal;
      maintaining the switching frequency of the inverter upon adjusting the power factor-corrected DC power based on the detected signal;
      adjusting the power factor-corrected DC power by varying a duty cycle; and
      controlling the switching frequency of the inverter within a designated frequency range.

9. The method of claim 8, wherein adjusting the switching frequency of the inverter includes:
   comparing a maximum magnitude of the detected signal with a threshold;
   adjusting the switching frequency of the inverter based on a result of the comparison; and
   maintaining the switching frequency of the inverter based on the maximum magnitude of the detected signal corresponding to the threshold based on the result of the comparison.

10. The method of claim 8, wherein adjusting the switching frequency of the inverter includes changing the switching frequency of the inverter to allow a maximum magnitude of the detected signal to correspond to a threshold using a pulse frequency modulation scheme.

11. A non-transitory computer-readable storage medium having stored thereon instructions, the instructions configured to be executed by at least one processor to enable the at least one processor to perform at least one operation, the at least one operation comprising:
   inverting direct current (DC) power into alternating current (AC) power through an inverter of a wireless power transmission device and outputting the AC power;
   generating a power signal for transmission of power to an electronic device through a coil circuit of the wireless power transmission device;

detecting a signal corresponding to the power signal using a coil-type detection unit disposed adjacent to the coil circuit; and adjusting a switching frequency of the inverter to change AC power output from the inverter based on the detected signal, wherein adjusting the switching frequency of the inverter includes:
- adjusting a magnitude of power input to the inverter by controlling a power factor corrector outputting power factor-corrected DC power to the inverter, based on the detected signal;
- maintaining the switching frequency of the inverter upon adjusting the power factor-corrected DC power based on the detected signal;
- adjusting the power factor-corrected DC power by varying a duty cycle; and
- controlling the switching frequency of the inverter within a designated frequency range.

* * * * *